Dec. 17, 1963 W. V. WENGER 3,114,202
METHOD OF PRESSURE WELDING METAL SHEETS
Filed March 24, 1960 2 Sheets-Sheet 1
FIG. 1
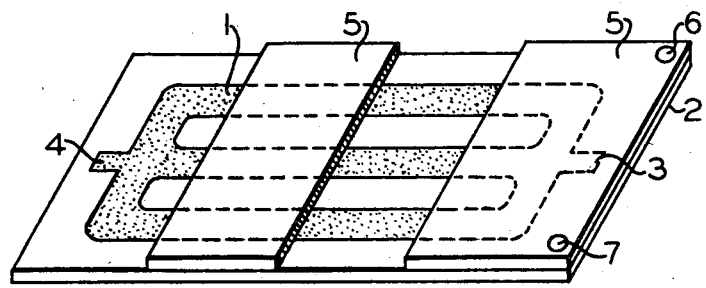
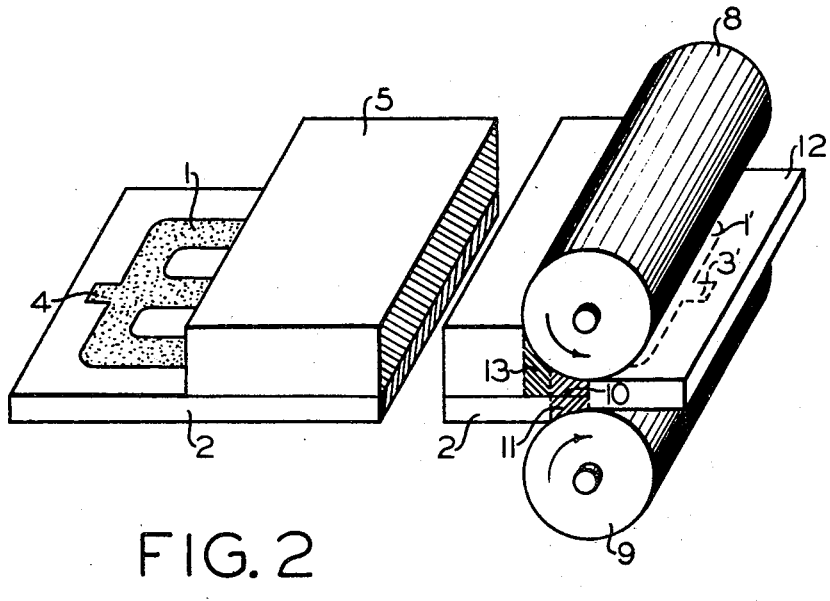
FIG. 2
*INVENTOR.*
WILLIAM V. WENGER
BY
ATTORNEYS Dec. 17, 1963 W. V. WENGER 3,114,202
METHOD OF PRESSURE WELDING METAL SHEETS
Filed March 24, 1960 2 Sheets-Sheet 2
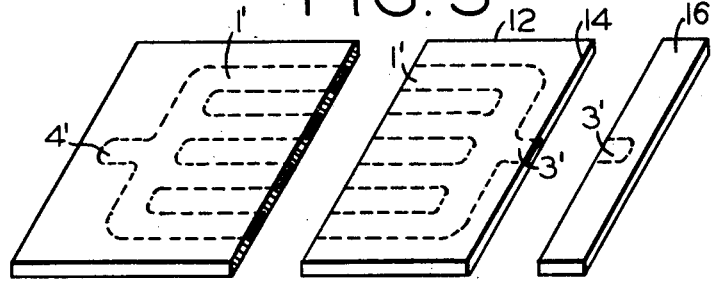
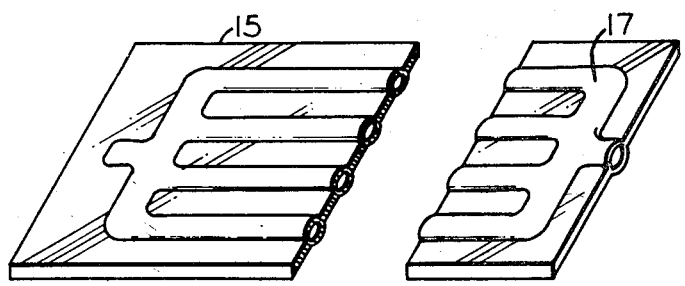
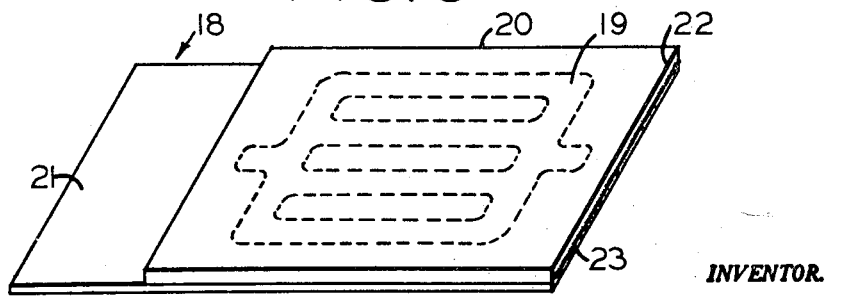
INVENTOR.
WILLIAM V. WENGER
ATTORNEYS United States Patent Office 3,114,202
Patented Dec. 17, 1963

3,114,202
METHOD OF PRESSURE WELDING METAL SHEETS
William V. Wenger, Alton, Ill., assignor to Olin Mathieson Chemical Corporation, East Alton, Ill., a corporation of Virginia
Filed Mar. 24, 1960, Ser. No. 17,308
11 Claims. (Cl. 29—470.9)

This invention relates to hollow articles and more particularly to a method of manufacturing hollow articles, such as heat exchangers and the like, of sheet metal.

For many purposes it is desirable to use heat exchangers of the plate-type having a system of tubular passages disposed therein. Generally such heat exchangers may be made from a plurality of superimposed metal sheets which have their adjacent surfaces selectively welded together in a predetermined pattern to define the desired system of passageways. A number of processes are available for manufacture of this type of structure, and according to a preferred mode of manufacturing these articles, a pattern of weld-inhibiting or stop-weld material is sandwiched between adjacent surfaces of superposed sheets and the two sheets secured together to prevent relative movement between each other whereafter they are subsequently pressure welded together, by hot rolling between mill rolls, in the adjacent areas thereof which are not separated by the stop-weld material. Rolling of the sheets, during pressure welding, results in reducing the thickness of the two sheets and elongating the resultant blank in the direction of rolling while the width of the resultant blank remains substantially the same as the initial width of the sheets. Following the hot rolling operation, the resultant blank is usually softened as by annealing to make it more pliable, and if desired, it may then be cold rolled and then softened as by annealing. After softening the blank, the unjoined portion, defined by the pattern of stop-weld material, is expanded by injecting therein a fluid pressure of sufficient magnitude to permanently distend the blank in the area of the unjoined portion to form the desired pattern of passageways.

In the aforesaid process it is essential that the pattern of stop-weld material be not smeared nor distorted during pressure welding or cold rolling to maintain precision and fidelity in the pattern so as to obtain corresponding degrees of precision and uniformity in the expanded tubular passageways. In the absence of maintaining such precision and fidelity in the stop-weld pattern, various problems occur in trimming of the blank, in various blanking operations on the pressure welded blank, critical disposition of tubular passageways for distribution of a precise pattern of heat transfer, and matching the tubular passage of one blank with other components that may be employed in combination with the blank, for example with various components of a refrigerator system. In addition, distortion of the pattern causes jagged rough edges along the edges of the pattern with corresponding loss in uniformity and precision in the cross-section of the expanded tubular passageways and particularly in the tubular passages transverse the direction of rolling and at the intersections of various tubular passages. Further, such jagged and rough edges also result in a variation in the rate of expansion in the tubular passageways and in their height.

Accordingly, it is an object of this invention to provide a novel process overcoming disadvantages of the prior art in obtaining precision in the disposition of tubular hollows within a hollow structure.

Another object of this invention is to provide a novel and improved method for making hollow articles of sheet metal.

A still another object of this invention is to provide a novel and improved process for making hollow articles by pressure welding or unification of metal component sheets between mill rolls.

A further object of this invention is to provide a novel and improved method of making hollow articles from metal component sheets having different degrees of plasticity.

A still further object of this invention is to provide a novel and improved method of making hollow articles from metal component sheets having different degrees of plasticity by pressure welding these sheets between mill rolls.

Other objects and advantages will become more apparent from the following description and drawings in which:

FIGURE 1 is a perspective view partly in section illustrating one embodiment of this invention;

FIGURE 2 is a perspective view partly in section illustrating the pressure welding of the embodiment illustrated in FIGURE 1;

FIGURE 3 is a perspective view partly in section illustrating the pressure welded article obtained from the embodiment depicted in FIGURE 1;

FIGURE 4 is a perspective view partly in section illustrating the article of FIGURE 3 subsequent to expansion; and FIGURE 5 is a perspective view illustrating another embodiment of this invention.

It has been discovered, contrary to accepted practices, that a precise pattern of stop-weld material defining a corresponding desired system of tubular passages can be obtained upon pressure welding of the component sheets between mill rolls while permitting relative movement between the component sheets over the pattern of stop-weld provided that no relative movement is permitted between the component sheets at the portion of their interface extending in the bite of the roll common to both of the component sheets. It has been found that if metal component sheets, with different degrees of plasticity, are pressure welded together in accordance with this invention, that irrespective of the differencies in elongation of each component sheet, their movement relative to each other over stop-weld pattern does not distort nor smear the pattern resulting in an equivalent degree of precision and fidelity in the elongated pattern within the pressure welded structure. As will be understood, as employed in this application, and in accordance with accepted teachings, the term "plasticity" in reference to the different metals refers to the difference in their ability to yield in permanent deformation under a given load or pressure.

More specifically, referring to the drawings, a pattern of stop-weld material 1 is coated on a clean weldable surface of a metal component sheet 2 in a pattern defining a corresponding desired system of tubular passageways. In order to adapt the resultant article for external connections, bands of stop-weld material 3 and 4 extend from pattern 1 to adapt it for an inlet and outlet connection in the ultimate article. A second metal component sheet 5 of shorter length and having different degrees of plasticity, than the first component sheet 2, is superimposed on the stop-weld coated surface of sheet 2 leaving a portion of the stop-weld pattern exposed on the extending surface of sheet 2. The component sheets may be employed in various thicknesses which, as will be understood, will be dependent on the final thicknesses desired in the component sheets of the ultimate product, the individual plasticity of each, and accordingly, the amount each sheet will elongate relative to the other. And, as will be understood, the specific combination of the dimensions of the component sheets is necessarily dependent on the specific application of the ultimate product.

Preferably the component sheet 5 will be of sufficient thickness so that its elongated length will be the same as the elongated length of component sheet 2 after pressure welding.

After superimposition of the sheets upon each other, the assembly of component sheets 2 and 5 is then suitably secured against misalignment at their leading edge by any suitable means such as spot-welding the corners at the leading edge, at 6 and 7, which will enter first between a pair of mill rolls 8 and 9. In accordance with this invention as illustrated in FIGURE 1, the major portion of component sheet 5 is unsecured and free to travel longitudinally relative to the stop-weld coated surface of component sheet 2.

After the component sheets have been secured against misalignment, they are cold or hot pressure welded in accordance with conventional practices which unifies and permanently deforms the component sheets into a composite panel of elongated configuration. For example, the component sheets may be heated to elevated temperatures and welded, by hot rolling, at elevated temperatures between the mill rolls in accordance with conventional welding techniques. However, in these welding operations it is essential that the portions of both component sheets which are adjacent the portion 10 of their interface extending in the portion of the bite, between the mill rolls, common to both of the component sheets, as indicated by the shaded portion 11, have no relative movement between them in order to obtain the desired degree of fidelity and precision in the corresponding elongated pattern 1' in the resultant pressure unified panel 12. To accommodate for the displacement of the more plastic component sheet 5 during elongation, the major portion of it, which is disposed on the entry side of the mill rolls, is free to move longitudinally relative to the stop-weld coated surface of the less plastic component sheet 2. It was found that even though the portion of the metal component sheet 5, indicated by the shaded area 13 in the bite of mill roll 8, moves over the stop-weld coated surface of sheet 2 there is no distortion or smearing of the stop-weld pattern 4.

Subsequent to pressure welding, the resultant pressure welded panel 12 was then appropriately trimmed along an edge 14 removing a portion 16, adjacent the edge 14, to expose the extending band of lamination, or nozzle receiving strip, 3 in order to adapt the panel for inflation with fluid pressure. After trimming the inlet lamination, a nozzle, not shown, was inserted into the resultant orifice and the panel expanded by injecting a fluid under pressure into the elongated pattern or internal lamination 1' to form the hollow article 15. The expansion of the panel may be accomplished by any convenient method, as for example the panel may be expanded freely or between spaced apart platens.

By way of example, a coating of stop-weld material 1 was applied to a surface of a sheet of 3004 type aluminum alloy, in accordance with the Aluminum Association's standard designations, having dimensions, of 24⅝ inches in length, 30¼ inches in width and 0.127 inch in thickness with the coating of stop-weld material covering substantially 75% of the surface to which it was applied. A shorter sheet of 1100 type aluminum alloy, in accordance with the Aluminum Association's standard designations, having dimensions of 19¾ inches in length, 30¼ inches in width and 0.169 inch in thickness was superimposed on the stop-weld coated surface of the 3004 type aluminum alloy so that its shorter dimension of 19¾ inches was parallel with the length of 24⅝ inches of the 3004 type aluminum alloy with the 30¼ inches dimension of both component sheets coextending with one another. As will be noted, the thickness of the 1100 type aluminum alloy is greater than the thickness of the other component sheet and is so selected so that after pressure welding it will have an elongated length substantially the same as the elongated length as the sheet of 3004 type aluminum alloy. Thus, although not required, it is preferred that the more plastic sheet will elongate with the less plastic sheet at a rate so that the more plastic sheet neither overlaps nor falls short of the terminal or tail end of the less plastic sheet in order to reduce the amount of scrap.

Any suitable stop-weld material capable of preventing the welding of adjacent surfaces may be employed. For example, the stop-weld material employed in conjunction with this example may be formulated from particles of graphite in which the major portion has a size not less than one micron with the largest portion of the particles of semi-colloidal size, i.e., within the range from about ½ micron to about 50 microns with most of these, at the lower end of the range, at around 5 or 10 microns. For purposes of most efficient application to the metal surface, the graphite particles are dispersed by means of any suitable dispersing agent in a suitable liquid vehicle such as water which can be easily driven off by volatilization. This stop-weld composition is formulated to a solid content in the range from about 10% to about 60% by weight, but preferably around 30% to 40%. This suspension of graphite particles is, preferably, applied to the surface of the less plastic component sheet in a coating corresponding to a density of deposit, of the graphite particles, in the range extending from about 1½ milligrams of the graphite particles per square centimeter to about 2½ milligrams per square centimeter.

The two superimposed component sheets of 1100 and 3004 type aluminum alloy were then secured against misalignment by spot-welding at the corners adjacent their leading edges, then heated to an elevated temperature between 900° F. and 950° F. and pressure welded at the elevated temperature by hot rolling them between a pair of mill rolls in the absence of any relative movement between their adjacent portions opposite their interface extending in the portion of the bite of said mill rolls common to both of the component sheets while the remainder of both panels free to move longitudinally relative to each other over the pattern of stop-weld material. During pressure welding the component sheets were given a sufficient reduction to accomplish the necessary unification, by welding, of their adjacent surfaces. Upon pressure welding, because of difference of plasticity of the component sheets, it was found that the more plastic sheet was reduced to a greater extent than the less plastic component sheet.

In addition, it was unexpectedly discovered that for a given work input the more plastic 1100 aluminum alloy sheet was elongated to a greater extent than expected which in this specific example amounted to 82% reduction for corresponding reduction in the less plastic sheet, of the 3004 type aluminum alloy, of 65%. This unexpected result provided added and unexpected advantages in accomplishing or obtaining greater elongations in the more plastic component sheet with a less work input. It was found that the increase in elongation in the more plastic component sheet was a direct function of the amount of the surface of the less plastic component sheet which was covered with the stop-weld material. For example, with a similar combination of aluminum component sheets, 1100 type and 3004 type alloys, each of the same gauge as in the previous example and under the same conditions of rolling and with the same amount of work input but having only a maximum of 20% of the surface of the 3004 type aluminum alloy covered with a pattern of stop-weld material, the more plastic component sheet was reduced to a lesser extent than in the preceding example. It was found that with this 20% maximum coverage of the surface of the less plastic component sheet which reduced 66% during pressure welding, a corresponding reduction of only 70% was obtained in the more plastic component sheet.

Thus, with the same amount of work input, the combination of 1100 and 3004 type aluminum sheets having the stop-weld material applied to 75% of the surface of the less plastic component sheet produced an elongation of 82% in the more plastic component sheet in comparison of only a 70% reduction in the more plastic component sheet, in this combination of alloys, in which only a maximum of 20% of the surface of the less plastic component sheet was covered with stop-weld material even though the less plastic sheet was elongated an additional one percent. As can be seen, this provides a definite advantage in reducing the amount of work input to obtain a specific amount of elongation in the more plastic component sheet. However, this unexpected phenomena must be taken into consideration with respect to the relative length if both component sheets are to be elongated by pressure welding to substantially the same length. Accordingly, the amount of foreshortening of the more plastic sheet must be increased in direct proportions to the amount of surface area of the coating of stop-weld material. As will be understood, the amount of additional foreshortening will depend in addition on the relative gauges of the component sheets and their specific compositions. The specific amount of foreshortening can be readily determined by conventional practices well known to those skilled in the art or by simple experimentations. For example, the conventional lengths of the component sheets may be calculated without consideration of the stop-weld coating, and the amount of reduction determined of the more plastic component sheet by measurement after pressure welding. The additional elongation obtained can then be converted into the amount of foreshortening in the initial length of the more plastic sheet.

Returning to the specific example, the combination of 1100 type and 3004 type aluminum alloys in conjunction with the 75% coverage of the surface of the more plastic component sheet with stop-weld material the resultant panel with the system of internal laminations corresponding to the pattern of stop-weld material may be suitably processed in accordance with conventional practices including further reduction to gauge, annealing and expansion by injection of a fluid pressure into the laminations to expand them to the desired configuration of tubular passageways 17.

Although the invention has been described with reference to a combination of a less plastic component sheet positioned on a more plastic component sheet of relatively shorter length having a portion of the pattern of the stop-weld material extending beyond its terminal end of the more plastic component sheet, it is to be understood that the invention is equally applicable to such a combination of component sheets in which the pattern of stop-weld is completely sandwiched between them with the less plastic component sheet extending beyond the more plastic component sheet and having none of its exposed surface coated with stop-weld material as illustrated in FIGURE 5. As shown therein, a less plastic component sheet 18 was coated with a pattern of stop-weld material 19 which was sandwiched between it and the superimposed more plastic component sheet 20 so that the portion of the surface 21 of the surface of component sheet extending beyond the more plastic component sheet 20 has no stop-weld material coated thereon. In this embodiment the two component sheets are secured against misalignment by welding their leading edges 22 and 23 with a weld 24 leaving the remaining portions of the component sheets free to move, both, relative to each other and over the pattern of stop-weld 19. Subsequent thereto, the component sheets are then unified together by pressure welding in accordance with this invention as described above.

Also, as will be understood, other combinations of metal may be processed in accordance with this invention, for example, the component sheets may be of various combinations of metals such as a composite panel fabricated by pressure welding a sheet of a B–152–58 type copper alloy, in accordance with ASTM designations for metals to a sheet of a copper base alloy having substantially the following composition; 92% to 94% copper, 2.05% to 2.60% iron, 0.03% maximum lead, 0.03% maximum tin, 0.02% maximum aluminum and remainder zinc. While it is obvious that the sheets may be initially of the same length for processing in accordance with this invention, this results in a substantial amount of scrap and loss of economy in the process, and thus, for maximum utility the more plastic sheet is foreshortened.

Thus, accordingly, although the invention has been described with respect to various embodiments, materials and details, various modifications and changes will be apparent to one skilled in the art and are contemplated to be embraced within the invention.

What is claimed is:

1. In the fabrication of a hollow article by inflation of an integral metal sheet formed by unification of two superposed metal component sheets, said superposed sheets being a relatively less plastic first metal component sheet and a relatively more plastic second metal component sheet wherein upon rolling said second sheet elongates to a greater extent relative to said first sheet, the method comprising, interposing between the adjacent surfaces of said superposed metal sheets a pattern of stop-weld material defining a corresponding system of tubular passages; and pressure welding the assembly of component sheets by rolling them between mill rolls in the absence of relative movement between adjacent portions of said component sheets opposite their interface extending in the portion of the bite of said mill rolls common to said component sheets while said component sheets are constrained against misalignment and with the remaining unrolled portions of said sheets free to move longitudinally relative to each other.

2. In the fabrication of a hollow article by an inflation of a composite metal sheet formed by unification of a relatively less plastic first metal component sheet to a relatively more plastic second metal component sheet wherein upon rolling said second sheet elongates to a greater extent relative to said first sheet the method comprising, coating a surface of said first sheet with stop-weld material in a pattern defining a corresponding system of tubular passages; positioning on said surface said second sheet of relatively shorter length than said first sheet so that said first sheet extends beyond said second sheet; and pressure welding the assembly of component sheets by rolling them between mill rolls in the absence of relative movement between the portions of said component sheets opposite their interface extending in the portion of the bite of said mill rolls common to both said component sheets while said component sheets are constrained against misalignment and with the remaining unrolled portion of said second sheet free to move longitudinally relative to said stop-weld coated surface of said first sheet.

3. The method of claim 2 wherein said first and second sheets are different alloys of aluminum.

4. The method of claim 3 wherein said first component sheet is 3004 type aluminum alloy and said second sheet is a 1100 type aluminum alloy.

5. The method of claim 2 wherein said first and second component sheets are different alloys of copper.

6. The method of claim 2 wherein the thickness of said second sheet is relatively greater than the thickness of said first sheet.

7. In the fabrication of a hollow article by an inflation of a composite metal sheet formed by unifiation of a relatively less plastic first metal component sheet to a relatively more plastic second metal component sheet wherein upon rolling said second sheet elongates to a greater extent relative to said first sheet the method comprising, coating a surface of said first sheet with stop-weld material in a pattern defining a corresponding system of tubular passages; positioning on said surface said second sheet of relatively shorter length than said first sheet so that said first sheet and a portion of its stop-weld coated surface extends beyond said second sheet; and pressure welding the assembly of component sheets by rolling them between mill rolls in the absence of relative movement between the portions of said component sheets opposite their interface extending in the portion of the bite of said mill rolls common to both said component sheets while said component sheets are constrained against misalignment and with the remaining unrolled portion of said second sheet free to move longitudinally relative to said stop-weld coated surface of said first sheet.

8. The method of claim 7 wherein said first and second sheet are different alloys of aluminum.

9. The method of claim 8 wherein said first component sheet is 3004 type aluminum alloy and said second sheet is 1100 type aluminum alloy.

10. The method of claim 7 wherein said first and second component sheets are different alloys of copper.

11. The method of claim 7 wherein the thickness of said second sheet is relatively greater than the thickness of said first sheet.

References Cited in the file of this patent

UNITED STATES PATENTS

| | | |
|---|---|---|
| 2,212,481 | Sndzimir | Aug. 20, 1940 |
| 2,386,091 | Carlson | Oct. 2, 1945 |
| 2,593,460 | Johnson | Apr. 22, 1952 |
| 2,690,002 | Grenell | Sept. 28, 1954 |
| 2,693,121 | Dight | Nov. 2, 1954 |
| 2,698,548 | Sowter | Jan. 4, 1955 |
| 2,739,369 | Cooney | Mar. 27, 1956 |
| 2,754,572 | Johnson | July 17, 1956 |
| 2,782,498 | Mushovic et al. | Feb. 26, 1957 |
| 2,786,265 | Keay | Mar. 26, 1957 |
| 2,800,709 | Gaul | July 30, 1957 |
| 2,906,006 | Neel | Sept. 29, 1959 |
| 2,908,073 | Dulin | Oct. 13, 1959 |
| 2,941,280 | Heuer et al. | June 21, 1960 |
| 2,993,269 | Kelley | July 25, 1961 |
| 2,999,307 | Compas | Sept. 12, 1961 |
| 3,015,157 | Reynolds et al. | Jan. 2, 1962 |

FOREIGN PATENTS

| | | |
|---|---|---|
| 793,364 | Great Britain | Apr. 16, 1958 |